(12) United States Patent
Chiang

(10) Patent No.: US 7,328,642 B2
(45) Date of Patent: Feb. 12, 2008

(54) HOLE-PUNCHING ASSEMBLY STRUCTURE FOR HOLE-PUNCHING UNIT

(76) Inventor: Chou-Chih Chiang, No. 13, 23th Rd., Taichung Industrial Park, Taichung 407 (TW)

( * ) Notice: Subject to any disclaimer, the term of this patent is extended or adjusted under 35 U.S.C. 154(b) by 124 days.

(21) Appl. No.: 11/393,803

(22) Filed: Mar. 31, 2006

(65) Prior Publication Data
US 2007/0234867 A1    Oct. 11, 2007

(51) Int. Cl.
  *B26F 1/14*    (2006.01)
  *B21D 28/34*   (2006.01)
  *B26B 28/34*   (2006.01)
  *B26D 28/34*   (2006.01)
(52) U.S. Cl. ..................... 83/687; 83/698.91
(58) Field of Classification Search .................. 83/620, 83/375, 684, 686, 687, 691, 698.31, 698.91
See application file for complete search history.

(56) References Cited
U.S. PATENT DOCUMENTS
6,536,321 B2 *  3/2003  Whiteman et al.  .......  83/698.31
6,769,339 B2 *  8/2004  Tiamson et al.  ...............  83/618
2007/0131074 A1 *  6/2007  Chiang  ........................  83/628

* cited by examiner

*Primary Examiner*—Terrence R. Till
*Assistant Examiner*—Joseph De Frank

(57) ABSTRACT

A hole-punching assembly comprising a positioning piece, a clamping piece, a plurality of tool holders, two balancing rods and a plurality of hole mountings. Each end of the positioning piece couples to the hole mounting through a balancing rod, the positioning piece has a gliding rail, a receiving slot and a confining part disposed at an indentation at each end for each of the tool holders to go through the positioning piece, thereby fixing the tool holders. Each of the tool holders has a first end extending to one of the hole mountings and a second end being blocked by the clamping piece. The clamping piece has one rod disposed at each end, with each end of the rod protruding through the receiving slot axially and being restrained by the confining part, thereby fixing the clamping piece and forcing the tool holder to move axially to facilitate easy switching and dismantling of the tool holders.

6 Claims, 7 Drawing Sheets

HOLE-PUNCHING ASSEMBLY STRUCTURE FOR HOLE-PUNCHING UNIT

BACKGROUND OF THE INVENTION

1. Field of the Invention

The present invention is related to a hole-punching assembly structure, and more particularly, to a multi-hole-punching unit for binding books, and still more particularly, to a hole-punching unit having a hole-punching assembly structure which can be adapted to hole shapes, hole position designs to swiftly dismantle, add or switch tool holders to facilitate availability and usability.

2. Description of the Prior Art

As of now, hole-punching unit is used to punch holes on a stack of papers to bind papers into a book. Due to different binding styles and requirements, a multi-hole-punching unit is provided to punch a plurality of holes on a stack of papers at a time.

Conventional multi-hole-punching unit is operated by driving a plurality of tool holders disposed at the hole-punching assembly to move back and forth to complete the hole-punching operation on a stack of papers. As the sheet number and weight of papers vary, the thickness of the paper stack is different, and configurations such as different binding requirements, gap between each hole and number of holes are different as well. In this case, user has to find a hole-punching assembly comprising corresponding tool holders according to sheet number and paper thickness, and also reduces or increases the number of tool holders based on number of holes and their relative positions. However, it is often necessary to remove the whole hole-punching assembly when using conventional hole-punching unit, which causes inconvenience in hole-punching operation.

In view of the above-described deficiencies of prior art hole-punching assembly structure, after years of constant effort in research, the inventor of this invention has consequently developed and proposed a new hole-punching assembly structure for hole-punching unit disclosed in the present invention.

SUMMARY OF THE INVENTION

The present invention is to provide a hole-punching assembly for hole-punching unit, wherein a positioning piece is disposed face to face to a clamping piece without using auxiliary tools to help dismantling and switching tool holders and to facilitate the usability of the hole-punching assembly.

Another, the present invention is to provide a hole-punching assembly structure for a hole-punching unit, comprising a main plate having a gliding rail obliquely and concavely formed on each side of the main plate, thus enabling a rod of a clamping piece to easily slide into the gliding rail from outside.

Accordingly, the present invention discloses a hole-punching assembly structure for a hole-punching unit, mainly comprising a positioning piece, a clamping piece, a plurality of tool holders, two balancing rods and a plurality of hole mountings. Each end of the positioning piece couples to one of the plurality of hole mountings via one of two balancing rods, each one of the plurality of tool holders goes through the positioning piece axially for the positioning piece to fix each one of the plurality of tool holders, each one of the plurality of tool holders has a first end extending to one of the plurality of hole mountings and a second end being blocked by the clamping piece, thereby allowing the clamping piece to force the plurality of tool holders to move axially for hole-punching operation.

The positioning piece comprises a main plate, the main plate has a retaining edge disposed protrudently at each side thereof, each retaining edge has a gliding rail obliquely and concavely formed towards its end and in symmetry with another retaining edge, the gliding rail has an end, which is contiguous to the main plate, connected to a receiving slot, and each retaining edge forms a confining part along an outer rim of the receiving slot.

The clamping piece has an elastic plate which is contiguous to the main plate, the elastic plate has one rod disposed at each end thereof, each one of the rod has a first end and a second end protruded through the receiving slot respectively, and the confining part is used for restraining the rod to fix the clamping piece to facilitate the convenience in switching and dismantling the plurality of tool holders.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
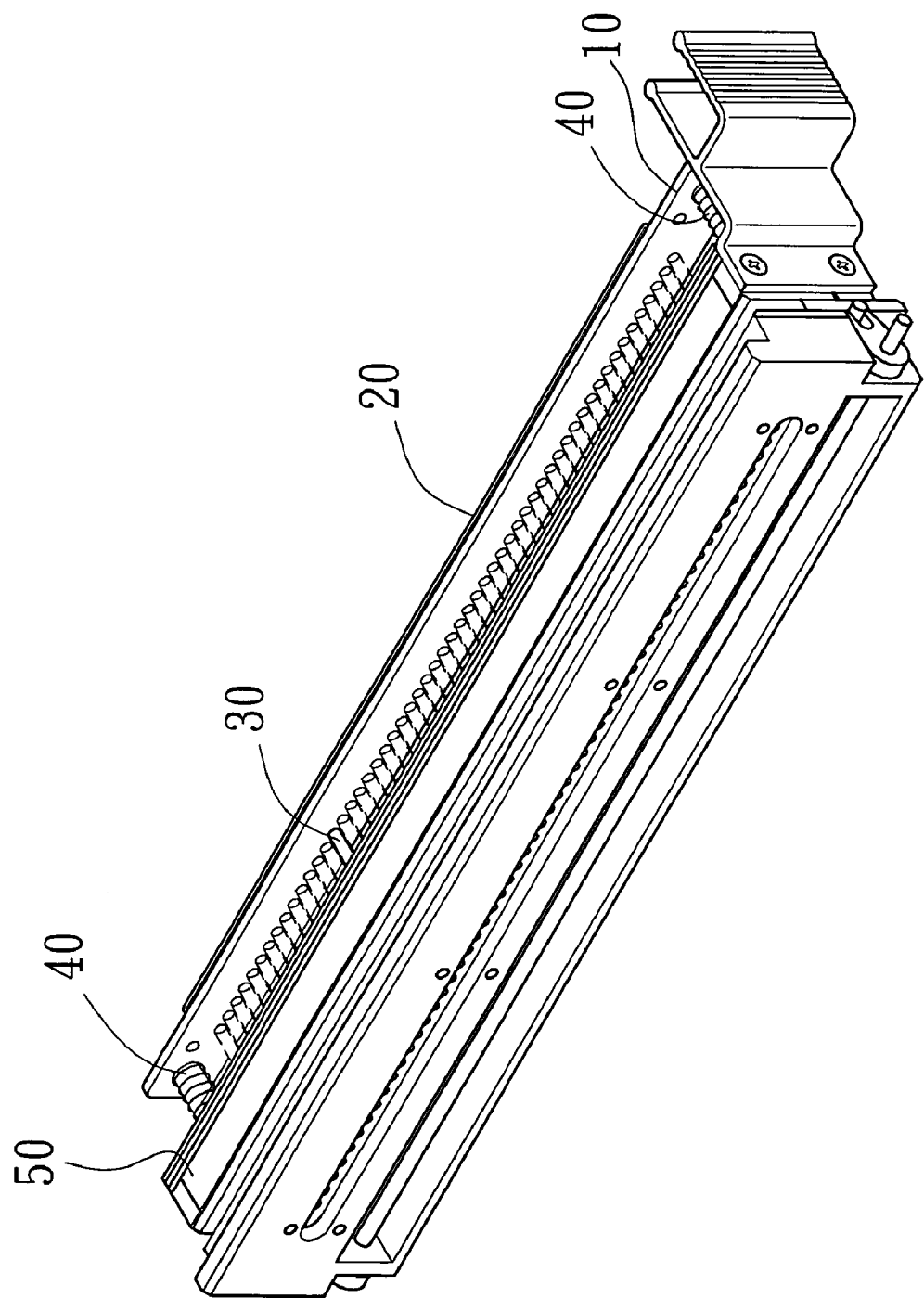
FIG. 1 is a perspective view of a preferred embodiment of the present invention.
Figure 2:
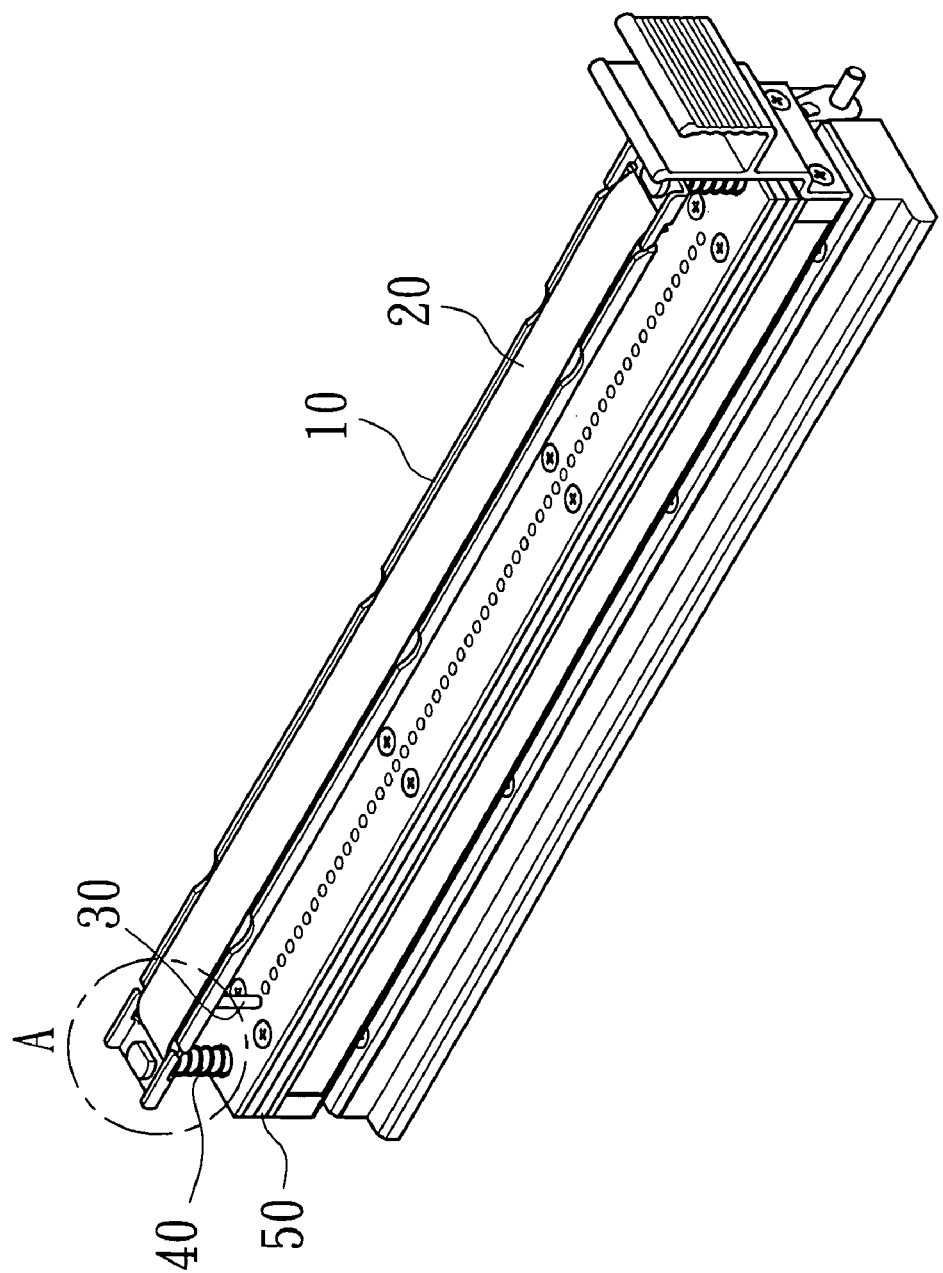
FIG. 2 is another perspective view which rotates 90 degree from the preferred embodiment of the present invention shown in FIG. 1.
Figure 3:
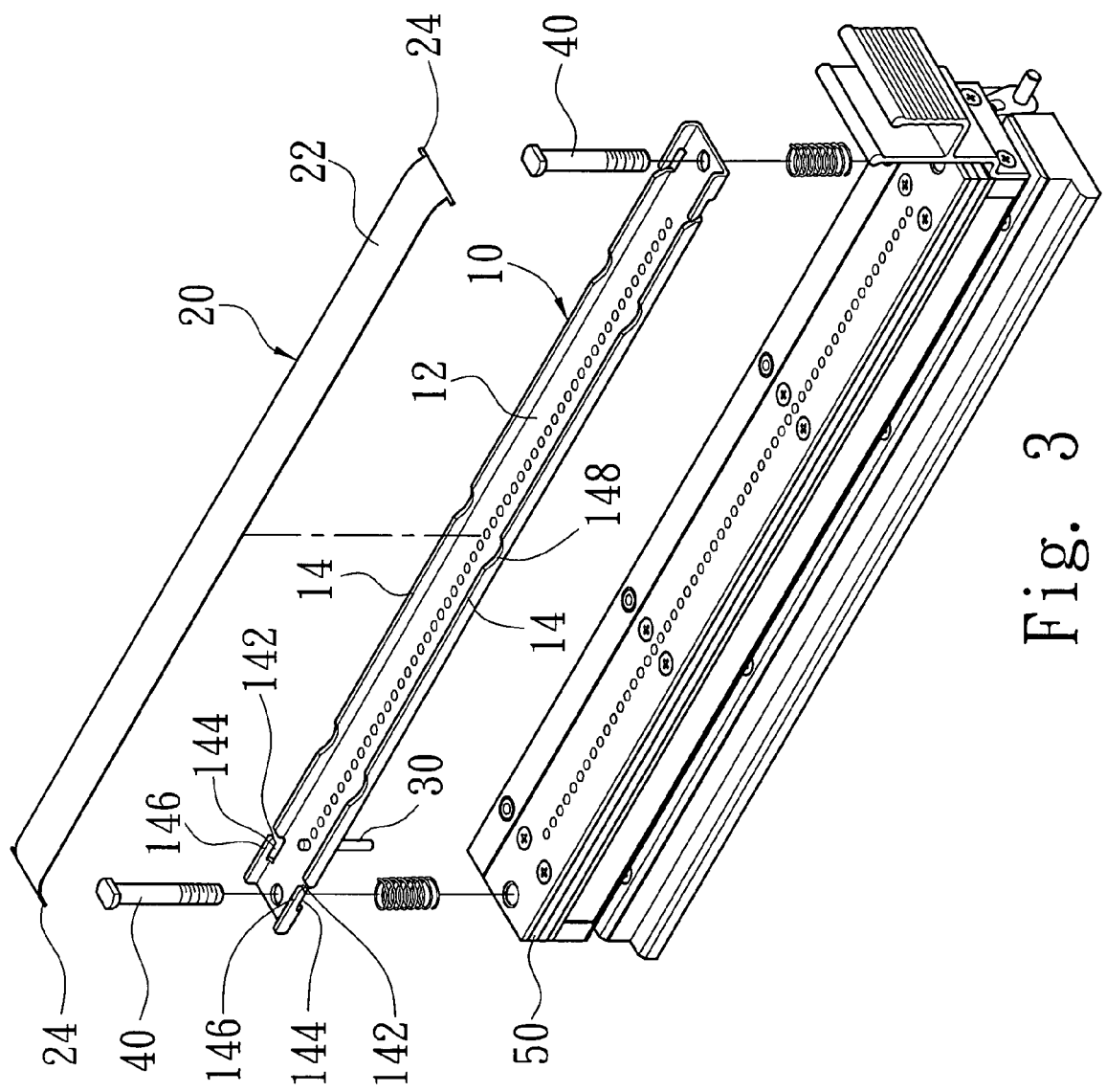
FIG. 3 is a perspective decomposing view which rotates 90 degree from the preferred embodiment of the present invention shown in FIG. 1.

Please refer to FIG. 1 to FIG. 3, the present invention discloses a hole-punching assembly structure for a hole-punching unit, mainly comprising a positioning piece 10, a clamping piece 20, a plurality of tool holders 30, two balancing rods 40 and a plurality of hole mountings 50. Each end of positioning piece 10 couples to one of the plurality of hole mountings 50 via one of two balancing rods 40, each one of the plurality of tool holders 30 goes through the positioning piece 10 axially for the positioning piece 10 to fix each one of the plurality of tool holders 30, each one of the plurality of tool holders 30 has a first end extending to one of the plurality of hole mountings 50 and a second end being blocked by the clamping piece 20, thereby allowing the clamping piece 20 to force the plurality of tool holders 30 to move axially for hole-punching operation. The above-mentioned structure will not be further discussed for the sake of brevity and its similarity to prior art techniques.

Figure 2A:
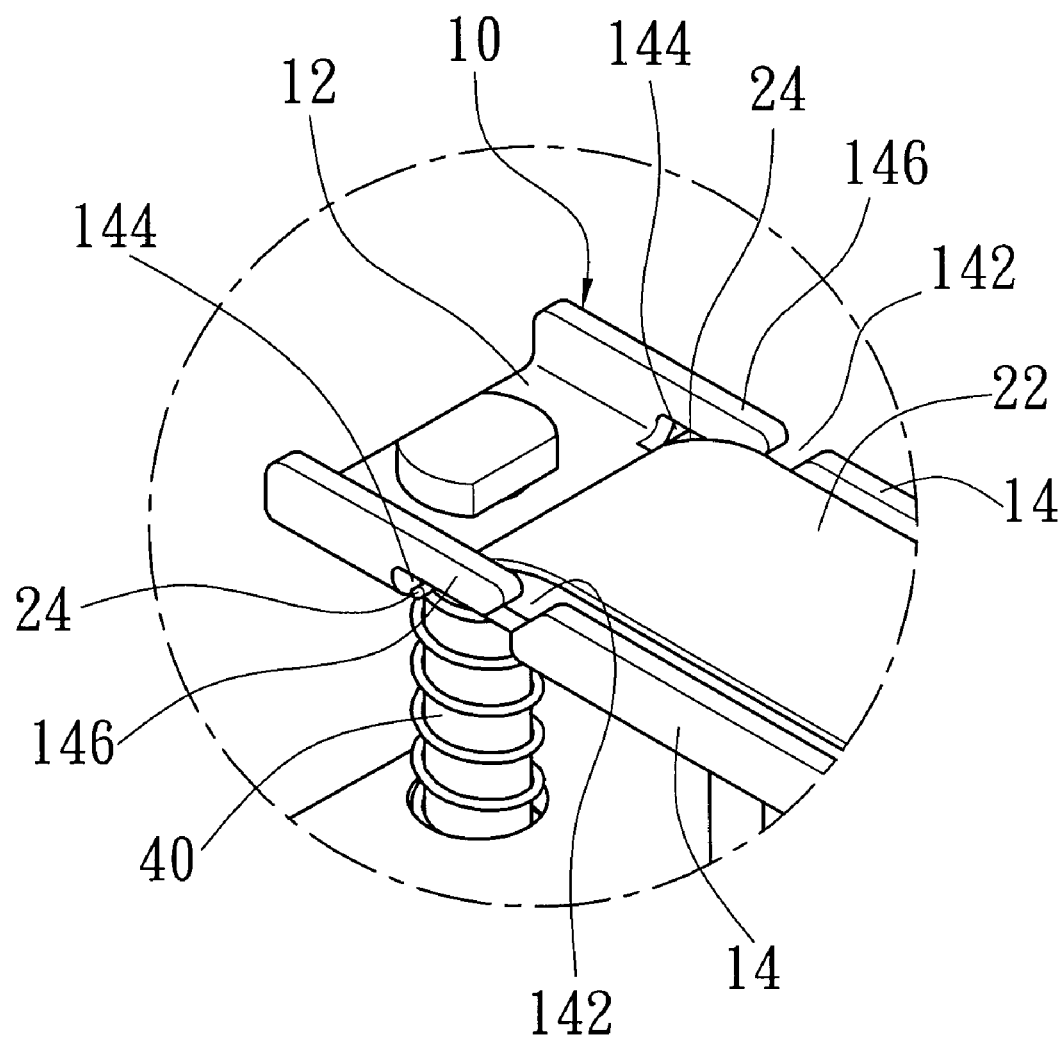
FIG. 2A is a partially zooming view of FIG. 2.

Please refer to FIG. 2, FIG. 2A and FIG. 3, the positioning piece 10 comprises a main plate 12 contiguous to the clamping piece 20. The main plate 12 has a retaining edge 14 disposed protrudently at each side thereof. Each retaining edge 14 has a gliding rail 142 obliquely and concavely formed towards its end and in symmetry with another retaining edge. The gliding rail 142 has an end which is contiguous to main plate 12, extended towards an outer rim of retaining edge 14 and connected to a receiving slot 144 which is axially parallel to main plate 12. Each one of the retaining edges 14 forms a confining part 146 along an outer rim of the receiving slot 144. Each retaining edge 14 has a plurality of arc-shape-like operation slots concavely formed at its middle portion, with the operation slots 148 forming between the gliding rails 142. The clamping piece 20 has an elastic plate 22 made of elastic material, which is contiguous to the main plate 12. The elastic plate 12 has each side restrained and fixed by the retaining edges 14. Besides, the elastic plate 12 has one rod 24 disposed at each end thereof, each rod 24 has a first end and a second end protruded through the receiving slot 144 respectively and the confining part 146 is used for the restraining rods 24 to fix the clamping piece 20.

Figure 4:
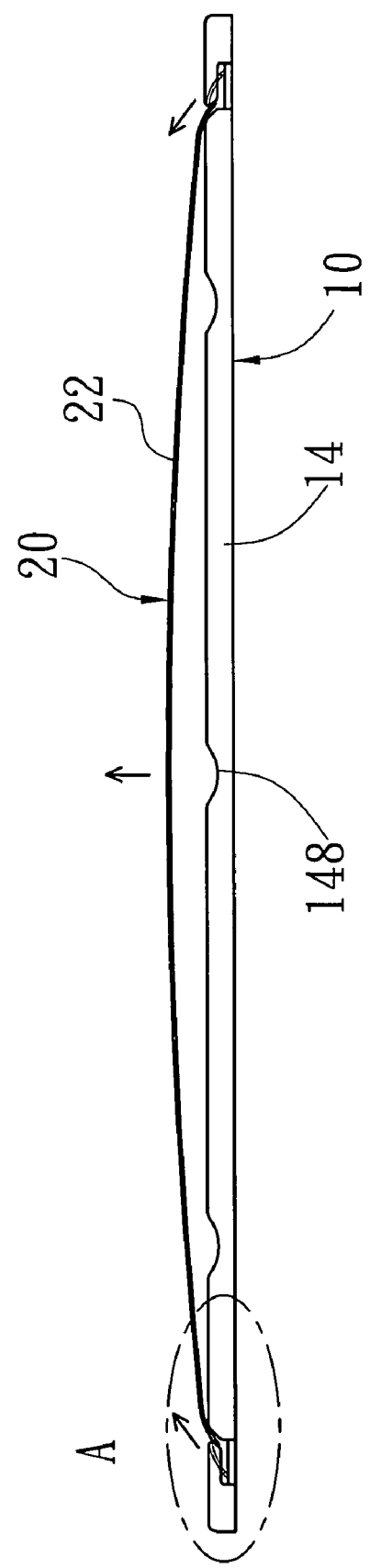
FIG. 4 is a vertical view of a first state of the clamping piece dismantled in a preferred embodiment of the present invention.
Figure 4A:
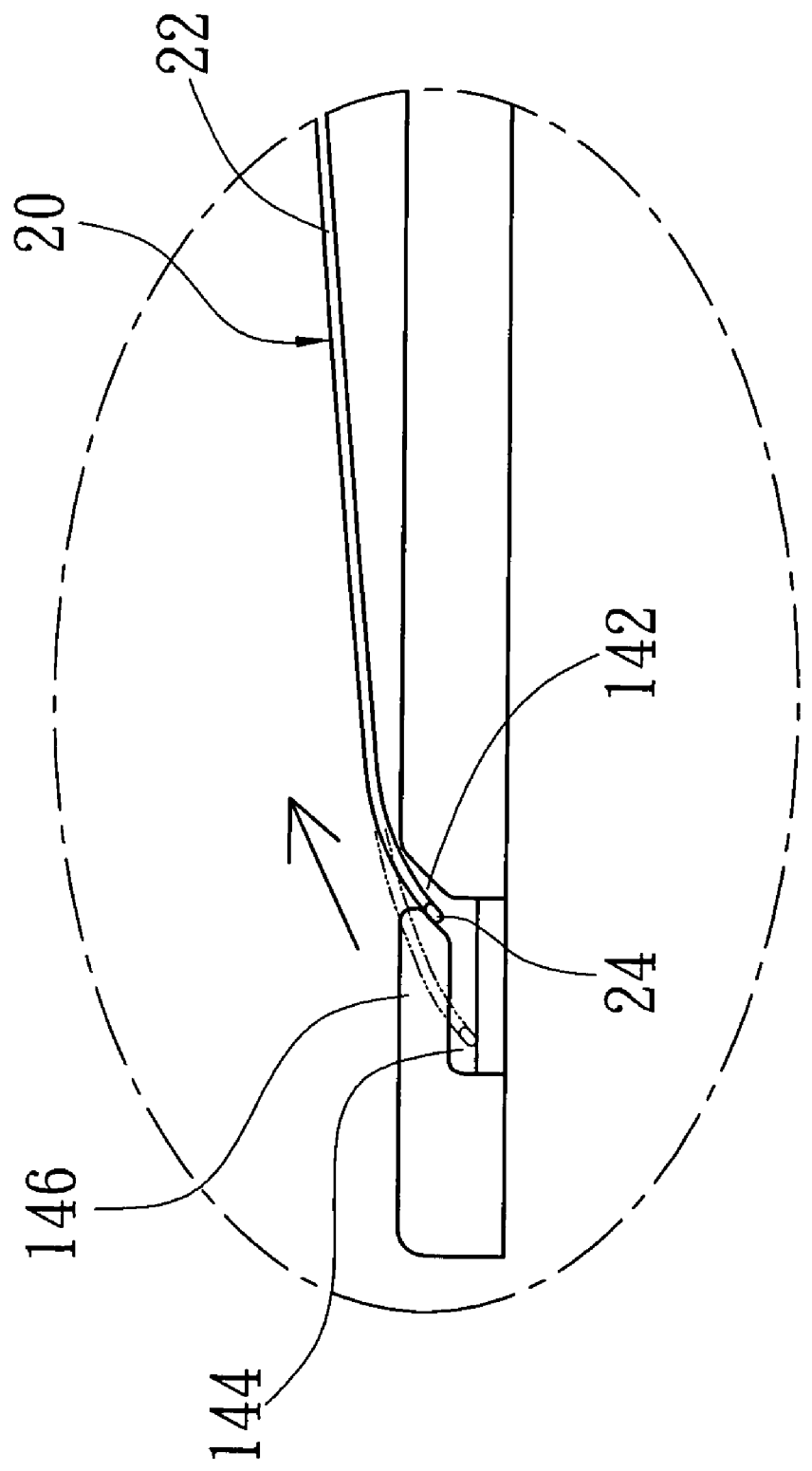
FIG. 4A is a partially zooming view of FIG. 4.
Figure 5:
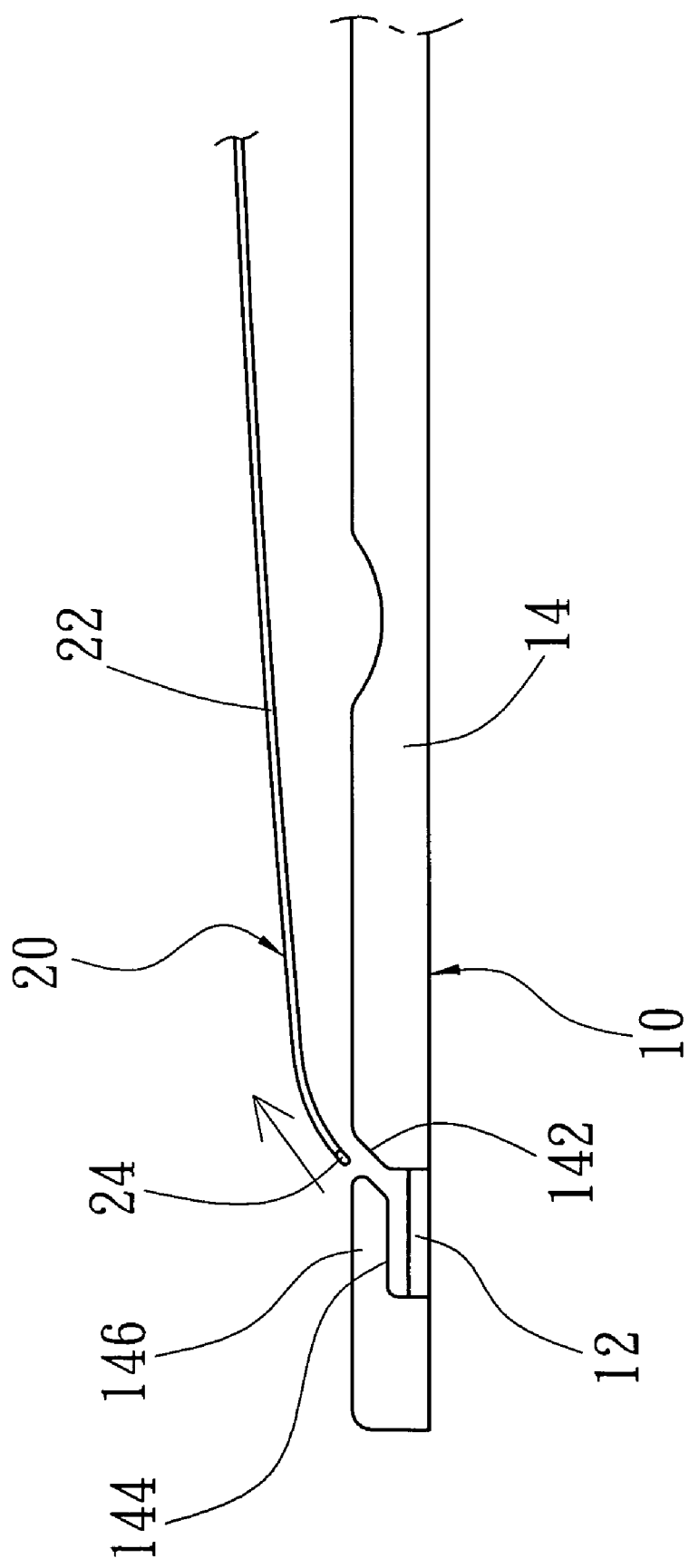
FIG. 5 is a vertical view of a second state of the clamping piece dismantled in a preferred embodiment of the present invention.

When an operator needs to change the number of tool holders and their positions or to switch to tool holders having different length due to various hole-punching requirements, the present invention is provided to firstly remove the constrain of the clamping piece 20 towards the end of each of the plurality of tool holder 30 to dismantle the hole-punching assembly or to add or to switch the tool holders. Please refer to FIG. 4 and FIG. 5, when an operator pulls the elastic plate 22 to deform the elastic plate 22 and to further force the rod 24 to slide to the gliding rail 142 along the receiving slot 144 (as shown in FIG. 4A), then the rod 24 will slide outside along the gliding rail 142 (as shown in FIG. 5). By doing so, it is easy and fast to break away the clamping piece 20 and the positioning piece 10, and to release the constrain upon the tool holder 30 to facilitate the process of switching the tool holders 30. When the adjustment of the tool holders is done, perform the above-mentioned operation backwards. That is, slide the rod 24 from outside into the gliding rail 142, then through the gliding rail 142 into the receiving slot 144 to dispose the rod 24 of the clamping piece 20 in the receiving slot 144. Afterwards, connect the clamping piece 20 once again to the positioning piece 10 to finish the operation of switching tool holders. Besides, the operation slots 148 makes it easy to deform the elastic plate 22 to facilitate the convenience in assembling and dismantling the clamping piece 20.

As described above, the present invention uses a novel structure comprising the positioning piece 10 and the clamping piece 20 to easily and swiftly dismantle the clamping piece 20 without using auxiliary tools, thereby facilitating dismantling and switching tool holders to vastly improve the operating efficiency and usability.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hole-punching assembly structure for hole-punching unit, comprises a positioning piece, a clamping piece, a plurality of tool holders, two balancing rods and a plurality of hole mountings, wherein each end of the positioning piece couples to one of the plurality of hole mountings via one of two balancing rods, each one of the plurality of tool holders goes through the positioning piece axially for the positioning piece to fix each one of the plurality of tool holders, each one of the plurality of tool holders having a first end extending to one of the plurality of hole mountings and a second end being blocked by the clamping piece, thereby allowing the clamping piece to force the plurality of tool holders to move axially for hole-punching operation, the positioning piece comprising a main plate, the main plate having one retaining edge disposed protrudently at each side thereof, each retaining edge having a gliding rail concavely formed towards an end thereof and in symmetry with another retaining edge, the gliding rail having an end contiguous to the main plate and connected to a receiving slot, and the retaining edge forming a confining part along an outer rim of the receiving slot;

the clamping piece having an elastic plate contiguous to the main plate, the elastic plate having one rod disposed at each end thereof, each rod having a first end and a second end protruded through the receiving slot respectively, the confining part being used for restraining each rod to fix the clamping piece.

2. The hole-punching assembly structure of claim 1, wherein each retaining edge has a plurality of operation slots concavely formed at a middle portion thereof, thereby facilitating the convenience in assembling and dismantling of the clamping piece.

3. The hole-punching assembly structure of claim 2, wherein the plurality of operation slots are in arc shape.

4. The hole-punching assembly structure of claim 1, wherein the end of the gliding rail extends towards an outer rim of the retaining edge.

5. The hole-punching assembly structure of claim 1, wherein the receiving slot is axially parallel to the main plate.

6. The hole-punching assembly structure of claim 1, wherein the gliding rail is obliquely and concavely formed.

* * * * *